United States Patent
Rasmussen

(10) Patent No.: US 9,626,148 B2
(45) Date of Patent: Apr. 18, 2017

(54) CREATING AN EVENT DRIVEN AUDIO FILE

(71) Applicant: Alec Edward Rasmussen, Los Angeles, CA (US)

(72) Inventor: Alec Edward Rasmussen, Los Angeles, CA (US)

(*) Notice: Subject to any disclaimer, the term of this patent is extended or adjusted under 35 U.S.C. 154(b) by 21 days.

(21) Appl. No.: 14/545,740

(22) Filed: Jun. 12, 2015

(65) Prior Publication Data

US 2016/0364204 A1 Dec. 15, 2016

(51) Int. Cl.
*G06F 17/00* (2006.01)
*G06F 3/16* (2006.01)
*G06F 17/27* (2006.01)
*G06F 17/22* (2006.01)

(52) U.S. Cl.
CPC .......... *G06F 3/165* (2013.01); *G06F 17/2235* (2013.01); *G06F 17/2705* (2013.01)

(58) Field of Classification Search
CPC . G06F 3/165; G06G 17/2235; G06G 17/2705
USPC .......................................................... 700/94
See application file for complete search history.

(56) References Cited

U.S. PATENT DOCUMENTS

| | | | |
|---|---|---|---|
| 7,685,022 B1 * | 3/2010 | Heyworth | G06Q 30/0603 705/26.8 |
| 7,769,829 B1 | 8/2010 | Riggs et al. | |
| 8,069,215 B2 * | 11/2011 | Jennings | G06Q 10/107 709/207 |
| 8,125,988 B1 | 2/2012 | Sullivan | |
| 2004/0205698 A1 | 10/2004 | Schliesmann | |
| 2004/0237120 A1 * | 11/2004 | Lewin | H04N 7/56 725/135 |
| 2006/0218294 A1 * | 9/2006 | Rosenberg | H04L 12/1859 709/231 |
| 2007/0101313 A1 | 5/2007 | Bodin et al. | |
| 2007/0204003 A1 * | 8/2007 | Abramson | H04L 67/02 709/217 |
| 2008/0086310 A1 * | 4/2008 | Campbell | G06Q 30/06 704/278 |
| 2009/0276066 A1 * | 11/2009 | Callanan | G10L 13/08 700/94 |

FOREIGN PATENT DOCUMENTS

KR 10-2003-0059943 A 7/2003

* cited by examiner

*Primary Examiner* — Hemant Patel
(74) *Attorney, Agent, or Firm* — Jeffrey K. Riddle; Fabian Vancott

(57) ABSTRACT

In one example, a device for creating an event-driven audio file may comprise a processor and an audio engine to, when executed by the processor, receive a configuration file designating a number of device-external data feeds and create an event-driven audio file based on the configuration file. In an example, a method of creating event-driven audio may comprise creating, with a processor, a configuration file, the configuration file comprising links defining device-external data feeds and with an audio engine, parsing the configuration file, and, based on the data defined in the configuration file, creating an event-driven audio file.

14 Claims, 4 Drawing Sheets

CREATING AN EVENT DRIVEN AUDIO FILE

The file of this patent includes duplicate copies of compact disc (CD-ROM) with a read only memory folder entitled "Creating an event-driven audio file." The folder was created on May 26, 2015 and is a size of 45,056 bytes. This folder contains the lines of code which represent a number of examples of a Computer Program Listing for this device, method, and computer program product described herein. This CD-ROM and the folder which is contained thereon are incorporated by reference to this Patent Application. This Application includes references to this Computer Program Listing Appendix on CD-ROM, the individual files within the folder, and the lines of code and the code line numbers contained therein.

BACKGROUND

Algorithmic composition, or the creation of music using algorithmic functions via a computing device, is a type of process used to create music with little or no human interaction. Often algorithms or computer-readable program code embodying those algorithms are used to artificially generate this music. These algorithms may be used in connection with a computing system that may use randomization processes to create the music.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
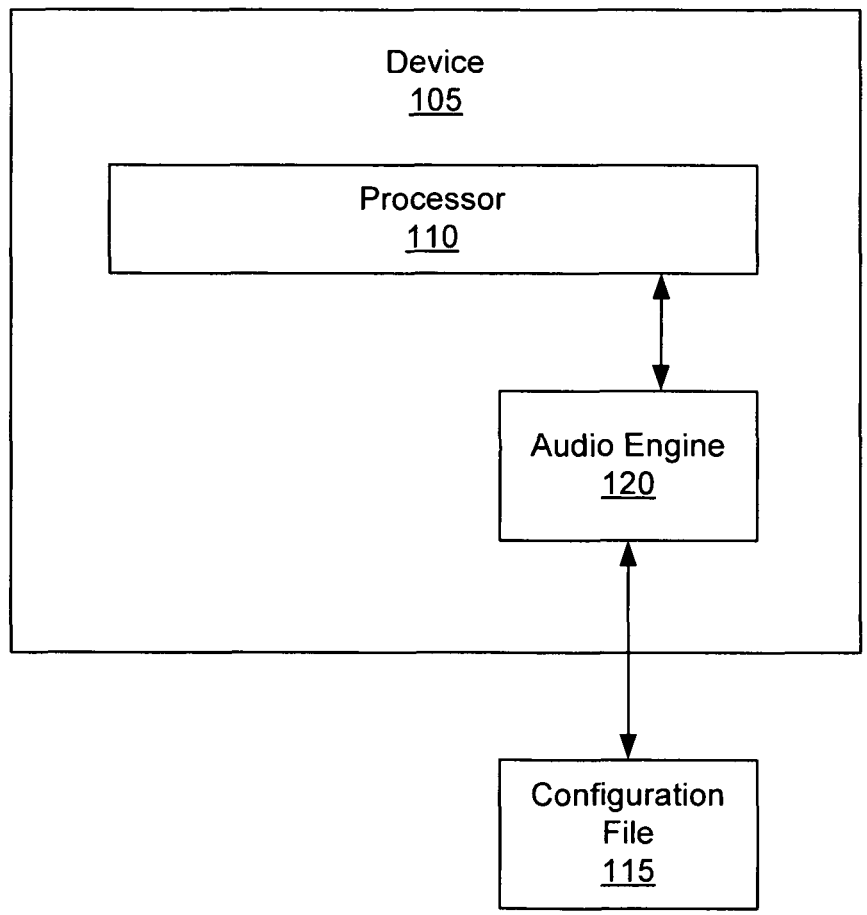
FIG. 1 is a block diagram of a device for creating event-driven audio according to an example of the principles described herein.

As described above, algorithmic composition may be used in connection with a computing device to create music: that music often being a new original piece. Creation of music is usually done by human artists implementing a number of music theories learned and applied in a new way to create a work of art not created previously. As with all art, whether a composition is pleasing will depend on a number of factors including proper application of those musical theories, presentation, and public perception of what constitutes "good" music. Algorithmic composition generally attempts to remove from the process of creating music those features of music dependent on "tastes" of the hearing public and replaces them instead with algorithms meant to artificially duplicate those "tastes."

Algorithmic composition, however, is mainly accomplished through use of a computing device rather than through the computing device creating the composition alone. Indeed, generally a computing device is used by a human composer merely implementing the computing device in a certain way to create the composition; the computing device being monitored and actuated in such a way as to facilitate a composer in the creation of the composition. In these circumstances, human interaction is necessary in order to create a composition.

The present specification describes a computing device and method that creates an audio file based on device-external data feeds. During operation of the device, a user may create an event-driven audio file automatically by simply imputing to the device an indication to begin the process as described herein. In some examples, the automation of the creation of an event-driven audio file may be accomplished by receiving, from a user, initial data describing how a number of event-driven audio file are to be created. Data feeds may be used as part of the decision criteria during the selection and arrangement of any aspects of the event-driven audio file. Those aspects may include a base track, audio samples, lyrics or speech associated with the composition, scripts defining rules, among others. Additionally, because the data feeds external to the device may be changed periodically (weather, traffic, news, etc.) all of the number of configuration files and, in turn, the event-driven audio files created may differ based upon those changes to the device-external data feeds. The device-external data feeds may further allow for any method of access to the base tracks, audio samples, lyrics or speech associated with the composition as described herein.

In one example, the present specification describes a device for creating an event-driven audio file, comprising a processor and an audio engine to, when executed by the processor, receive a configuration file designating a number of device-external data feeds and create an event-driven audio file based on the configuration file. The device, therefore, may create the even-driven audio file based on the data feeds referenced by the configuration file. The configuration file may also designate a number of audio files and/or audio samples used in the creation of the event-driven audio file. In one example, the configuration file may also reference, via a link, a number of customizable scripts defining rules that will implement the latest data from the device-external data feeds as part of a number of decision criteria in selecting and placing the audio files and/or audio samples in to the event-driven audio file. The audio engine may comprise an arranger module, mixer module, and mastering module to arrange, mix, finalize the event-driven audio file, and generally instruct in the digital signal processing (DSP) of the audio files.

In one example, the present specification describes a method of generating event-driven audio, comprising creating, with a processor, a configuration file, the configuration file comprising links defining device-external data feeds and with an audio engine, parsing the configuration file, and, based on the data defined in the configuration file, creating an event-driven audio file. Implementing the method may create the even-driven audio file based on the data feeds referenced by the configuration file. In one example, the configuration file may also designate a number of audio files and/or audio samples used in the creation of the event-driven audio file.

In an example, the present specification describes a non-transitory computer-readable storage medium comprising instructions which, when executed by a processor of a device for generating an event-driven audio file, causes the processor to create a configuration file comprising links defining device-external data feeds and, with an audio engine, parse the configuration file and create an event-driven audio file.

As used in the present specification and in the appended claims, the term "device-external data" is meant to be understood broadly as any data accessible by a device and external to that device. In an example, device-external data may comprise data defined on a website or provided by a website and accessed by a device over a network. In an example, device external data may be extracted from external automatic program interfaces (APIs), databases or other data volumes.

Additionally, as used in the present specification and in the appended claims, the term "script" is meant to be understood as series of commands, combined in a file, that carry out a particular function when the file is run. In one example, the script may be interpreted by, for example, an audio engine while the scripts are run.

Further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a device (105) for creating event-driven audio according to an example of the principles described herein. The device may be implemented in an electronic device. Examples of electronic devices include servers, desktop computers, laptop computers, personal digital assistants (PDAs), mobile devices, smartphones, gaming systems, and tablets, among other electronic devices. The device (105) may be utilized in any data processing scenario including, stand-alone hardware, mobile applications, through a computing network, or combinations thereof. Further, the device (105) may be used in a computing network, a public cloud network, a private cloud network, a hybrid cloud network, other forms of networks, or combinations thereof. In one example, the methods provided by the device (105) are provided as a service over a network by, for example, a third party. In this example, the service may include, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system may be executed on one or across multiple platforms. Such modules may run on various forms of cloud technologies and hybrid cloud technologies or offered as a SaaS (Software as a service) that may be implemented on or off the cloud. In one example, the methods provided by the device (105) are executed by a local administrator.

To achieve its desired functionality, the device (105) includes various hardware components. Among these hardware components may be a number of processors (110). The processor (110) may include the hardware architecture to retrieve executable code from a data storage device and execute the executable code. The executable code may, when executed by the processor (110), cause the processor (110) to implement at least the functionality of receiving a configuration file (115), the configuration file (115) comprising data describing links to a number of device-external data feeds, a number of audio files and audio samples associated with those data feeds, and a number of audio files and audio samples associated with the device (105) according to the methods of the present specification described herein. The configuration file (115) may further comprise scripts defining rules which, when executed, provide instructions to parse the device-external data feeds and use them to pick and place the audio samples and/or audio files. The executable code of the configuration file (115) and scripts therein may, when executed by the processor (110), also cause the processor (110) to implement at least the functionality of creating an event-driven audio file based on the configuration file (115) according to the methods of the present specification described herein. In the course of executing code, the processor (110) may receive input from and provide output to a number of the remaining hardware units.

The device (105) may further include a number of modules used in the implementation of receiving a configuration file (115), accessing a number of audio samples, and creating an event-driven audio file based on the configuration file (115). The various modules within the device (105) include executable program code that may be executed separately. In this example, the various modules may be stored as separate computer program products. In another example, the various modules within the device (105) may be combined within a number of computer program products; each computer program product comprising a number of the modules.

In one example, a configuration file (115) may be created by a user and may include executable code that, when executed by the processor (110) causes an audio engine (120) to create an event-driven audio file. In one example, the configuration file (115) may include links, URLs, or file paths to audio files, audio samples, and/or sets of scripts that may be used to create the event-driven audio file. As will be described in more detail below, the scripts may define rules by which the data-external data feeds are to be used and manipulated during the creation of the event-driven audio file.

In one example, the configuration may bundle the scripts, audio files, and/or audio samples for use by the audio engine (120) as described herein. In this example, the audio samples, audio files, and scripts may be bundled directly into the configuration file (115), as either binaries or in any other format described herein so that the configuration file (115) may more easily be optimized, packaged and distributed. In one example, the data feed itself may be bundled into the configuration file (115) if the data feed represents static data such as user preferences or a section of a database.

In one example, where links, URLs, or file paths to audio files, audio samples, and/or sets of scripts are provided in the configuration file, a number of fallback links may also be referenced. The fallback links may be provided in the event the links, URLs, or file paths to the resources are not accessible but are also accessible in the locations defined by the fallback links. The fallback links may also be provided in the event that network connectivity between a network and the device (105) is found to be unreliable.

The configuration file (115) may further specify cryptographic checksums for any audio files, audio samples, or rules accessed by the device (105). This may be done in order to verify the accuracy of the audio files, audio samples, or rules. Additionally, the cryptographic checksums may provide public/private encryption keys for secure access to the data feeds as well as maintain safe network transfers of any data accessed by the device (105) according to the configuration file. Some examples of cryptographic checksums may include SHA-, SHA-2, among others.

As will be described in more detail below, the configuration file (115) may be created by a user implementing any number of devices or computer-readable program code to do so. In one example, the device (105) receives the configuration file (115) from another device external to the device (105). In another example, the user implements a software compiler program associated with the device (105) to create the configuration file (115). In yet another example, a user may implement a configuration file generator associated with the device (105). This will be described in more detail below.

The configuration file (115) may comprise a set of scripts and/or data defining external data feeds that may be used as decision criteria in the selection and arrangement of audio files and/or audio samples used to create the event-driven audio file. The configuration file (115) may also include computer-readable program code describing: how to apply audio mixing processes; what audio mixing processes to apply to which of the number of audio files and/or audio samples; how to process a number of groups of audio files and/or audio samples; what audio mastering processes to apply to the event-driven audio file; and generally how to apply any DSP to the base audio, audio files, audio samples, and/or the event-driven audio file. Audio mixing is the process by which multiple audio files and/or audio samples are combined into a number of channels. Using audio mixing, the configuration file (115) may be written so as to control any audio files' or audio samples' signal level, frequency content, dynamics, panoramic position, and/or reverb. Audio mastering may include applying compression, equalization, gain, or other effects to the audio after mixing. Audio mastering may also include the process of converting from a first audio coding format to a second coding format or other type of post event-driven audio file creation process. The mixing and mastering processes may be referred to as digital signal processing (DSP) herein. In the present specification and in the appended claims, the term "digital signal processing (DSP)" is meant to be understood as any mathematical manipulation of an audio signal to modify or improve the audio signal in some way.

As briefly described above, during operation of the device (105), the configuration file (115) may be received by an audio engine (120). Because the configuration file (115) may comprise any type of computer readable program code that may be read by the audio engine (120), the audio engine (120) may, when executed by the processor (110), create an event-driven audio file pursuant to the computer-readable code and files defined in and/or referenced by the configuration file. An example of default computer readable program code defining a configuration file prior to user input or user augmentation of the configuration file is found in the CD-ROM disk, with a folder entitled "Creating an event-driven audio file" and a file name of "Default event-driven audio computer readable code." (herein referred to as "default"). The computer-readable program code defined in the default file is incorporated by reference herein. With the configuration file as updated by the user, the audio engine (120) may create the event-driven audio file, save the event-driven audio file to a data storage device, and cause an audio device to play the event-driven audio file according to the computer-readable code defined in the configuration file. Additional details on the functionality of the audio engine (120) will be discussed in more detail below.

In one example, the audio engine (120) may be a hardware device programed to receive the configuration file and create an event-driven audio file as described herein. In one example, the audio engine may be a computer module that receives the configuration file and, with the processor (110) executes code to provide the functionality described herein. The audio engine (120) may execute computer-readable program code as provided in an example computer-readable program code labeled "AudioEngine.txt" listed in the CD-ROM disk incorporated by reference in this specification. This Audio Engine.txt file may be executed as a .py file and may be written in Python® v.3 code. This computer-readable program code defined therein is incorporated by reference herein. Python computer code is an executable program code developed by the Python Software Foundation. Execution of this example computer-readable program code allows the audio engine (120), via the processor (110), to create the event-driven audio file as described herein.

Figure 2:
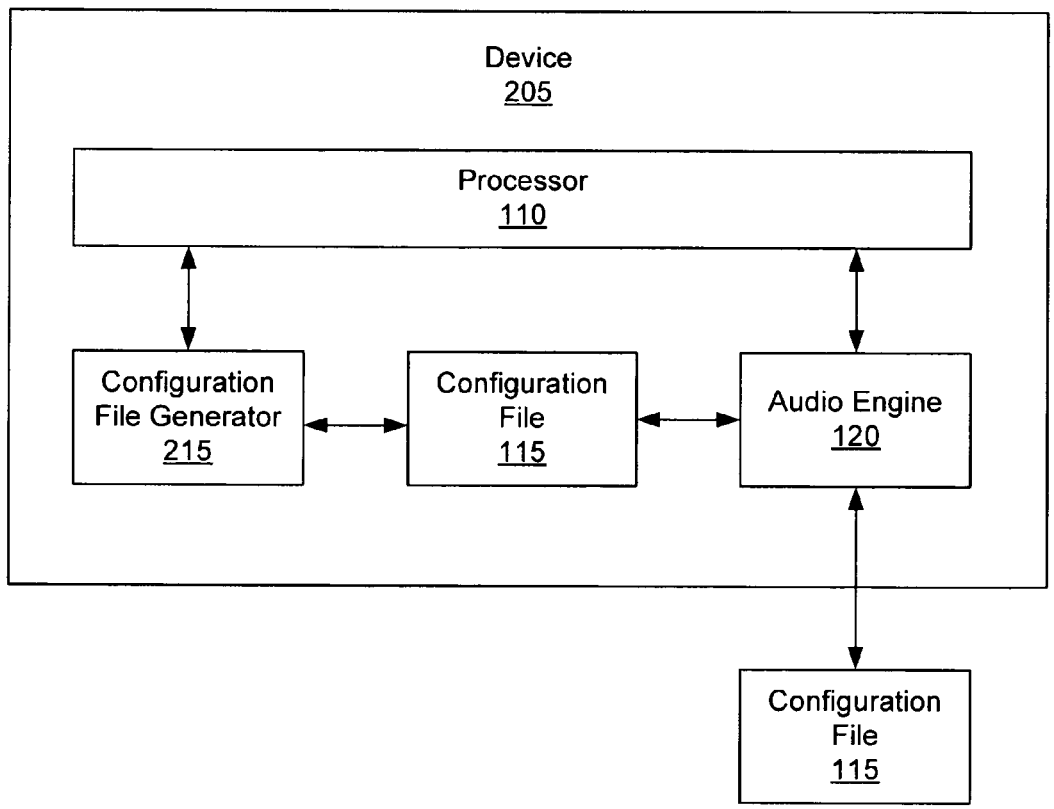
FIG. 2 is a block diagram of a device for creating event-driven audio according to an example of the principles described herein.

FIG. 2 is a block diagram of a device (105) for creating event-driven audio according to an example of the principles described herein. The device (105) may be implemented in an electronic device as described above in connection with FIG. 1. Similar to FIG. 1, the device (205) may be utilized in any data processing scenario including, stand-alone hardware, mobile applications, through a computing network, or combinations thereof. Further, the device (205) may be used in a computing network, a public cloud network, a private cloud network, a hybrid cloud network, other forms of networks, or combinations thereof. In one example, the methods provided by the device (205) are provided as a service over a network by, for example, a third party. In this example, the service may include, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system may be executed on one or across multiple platforms. Such modules may run on various forms of cloud technologies and hybrid cloud technologies or offered as a SaaS (Software as a service) that may be implemented on or off the cloud. In another example, the methods provided by the device (205) are executed by a local administrator.

To achieve its desired functionality, the device (205) includes various hardware components. Among these hardware components may be a number of processors (110). The processor (110) may include the hardware architecture to retrieve executable code from a data storage device and execute the executable code. The executable code may, when executed by the processor (110), cause the processor (110) to implement at least the functionality of generating a configuration file (115) based on data defining a number of device-external data feeds and a number of audio files and audio samples and creating an event-driven audio file based on the configuration file according to the methods of the present specification described herein. In the course of executing code, the processor (110) may receive input from and provide output to a number of the remaining hardware units.

The device (205) may further include a number of modules used in the implementation of generating and receiving a configuration file (115) based on data defining a number of device-external data feeds and a number of audio samples and creating an event-driven audio file based on the configuration file. The various modules within the device (205) include executable program code that may be executed separately. In this example, the various modules may be stored as separate computer program products. In another example, the various modules within the device (205) may be combined within a number of computer program products; each computer program product comprising a number of the modules.

The device (205) may include a configuration file generator module (215) to, when executed by the processor (110), receive input from a user via, for example, a peripheral device (i.e. keyboard, mouse, etc.) and create a configuration file (115) for consumption by an audio engine. The configuration file generator (215) may receive certain input which is processed by the processor (110) in order to create the configuration file. In one example, the configuration file generator (215) may be a software compiler program associated with the device (205). In this example, the user may write the computer-readable program code for the configuration file (115) using the software compiler program and provide that code to the audio engine (120). In another example, a text editor may be used to create the computer-readable program code and may also be provided to the audio engine (120) for processing as described herein. The generated computer-readable program code may be in a .JSON or .YML file format.

In one example, the configuration file generator module (215) may be computer-readable program code defining a set of interactive graphical user interfaces that are presented to a user via, for example, a computer screen such that a user may select from a number of rules or executable code and the scripts associated with those rules. Selection of the rules or scripts will cause the scripts defining the rules to be automatically populated into the computer-readable program code defining the configuration file.

In one example, the configuration file (115) generated by the configuration file generator module (215) may be used multiple times to generate a new audio file every time the configuration file (115) is consumed by the audio engine. In another example, the device (205) may copy portions of the configuration file (115) and modify its contents based on separate user input or external data sources as will be described below. In still another example, a new configuration file (115) may be generated every time an audio file is to be generated.

The configuration file generator module (215) may receive any type of input used to create or modify a configuration file (115) as described herein. The processor (110) may receive from a user data describing the name of the user, the author of the audio track being created, a license or copyright notice or link to such notice, and other information associated with the user. As will be described in more detail below, the configuration file (115) is consumed by an audio engine and during this consumption an event-driven audio file is output. The output event-driven audio file may be saved and may have metadata associated with it such as the user data described above. In this example, the name of the user, the author of the audio track being created, a license or copyright notice or link to such notice, and other information associated with the user will be saved as metadata associated with the event-driven audio file created by the audio engine.

As briefly described above, the configuration file generator module (215) may receive data associated with a number of device-external data feeds. The device-external data feeds may be used as decision criteria in the selection and arrangement of any aspects of the event-driven audio file. In the present specification and in the appended claims, the term device-external data feeds is meant to be understood as any source of data that is provided to the device (205) and is not inherent on the device (205). The device-external data feeds may comprise any data that may be accessed by an audio engine in the device (205) when the processor (110) of the device (205) is supplied with access to the data as indicated in the configuration file (115). In one example, the data feeds are publically accessible over, for example, the Internet. In one example, the device-external data feed is provided to the audio engine via a network connection connecting the device (205) to, for example, the Internet. In one example, the data feed is an application programming interface (API). In one example, the data feed is any database external to the device (205). Some examples of data feeds may include weather websites such as those operated by Open Weather Map or Weather Underground®; financial websites and price feeds such as Yahoo® Finance or ;Quandl®; time data derived from a device (205) external data feed or from the device itself; traffic websites; news websites; audio websites; device internal or external calendaring systems; among others. In one example, data from online sources may be cached in the device (205) and updated periodically. In this example, the cached data will serve as the source from which the audio engine retrieves the offline content while consuming and interpreting the configuration file. The data associated with these feeds may be referenced via a link or URL defined in the configuration file. Specific examples of data associated with device-external data feeds as well as the scripts defining rules on how to manipulate the date will be discussed below.

The configuration file generator module (215) may receive data associated with a number of audio files and/or audio samples. In this example, uniform resource locators (URLs) or other types of links may be used to point to those audio files and/or audio samples. The links or URLs may be presented as a list of key/value pairs assigning names to a collection of those links or URLs arranged in a hierarchy of directories and subdirectories that each point to associated audio files and/or audio samples.

In the present specification and in the appended claims, the term "audio sample" is meant to be understood as a portion of an audio file not constituting the whole original audio file. Additionally, as used in the present specification and in the appended claims the term "audio file" is meant to be understood as an original or complete version of an audio composition. Both the audio files and audio samples described herein may be in any format such as, WAV, AIFF, AU or raw header-less PCM, FLAC, Monkey's Audio (filename extension .ape), WavPack (filename extension .wv), TTA, ATRAC Advanced Lossless, ALAC (filename extension .m4a), MPEG-4 SLS, MPEG-4 ALS, MPEG-4 DST, Windows Media Audio Lossless (WMA Lossless), Shorten (SHN), MP3, and .OGG, among others.

The configuration file generator module (215) may also receive data associated with the length of the audio track to be created by the audio engine. In one example, this user provided data may indicate that the track is to be an exact predetermined length. In another example, the data may indicate that the audio file may be more or less than a set predetermined length but within a threshold length. In this example, the audio engine may, during consumption of the configuration file (115) created, alter certain parameters of other data in the configuration file (115) to create a track having a length that falls within the threshold.

The configuration file generator module (215) may also receive data, such as via a link or URL, of a "base" track or static audio file that the audio files and/or audio samples may be combined with as described above. In one example, the base track may be saved locally on the device (205) and linked or referenced in the configuration file. In this example, the base track may be used repeatedly every time a user initiates the process of generating a new configuration file (115) for consumption by the audio engine (120). In another example, the base track may be accessed through the network via a URL similar to the audio files and audio samples.

The configuration file generator module (215) may also receive data associated with a number scripts defining rules on how to manipulate the audio files and device-external data feeds. In one example, each rule and its associated script may be generated deterministically where the values of any dynamic variables in any script contributes to a determination of the values of the variables at any later time. In another example, each rule and its associated script may be generated via user input where the user provides data associated with each variable in the rules and their scripts.

In one example, the rules and scripts may incorporate data learned by examining audio playback behavior and user engagement among other metrics. The device (205) may therefore, implement Bayesian inference processes, machine learning processes, or other methods to determine what data is to be incorporated into the script of the rules. In one example, any computing device associated with the rules and scripts may incorporate this learned data by either writing the learned data to output, saving the learned data to a database, or updating any source code associated with the scripts and rules with the learned data.

Each rule may be used to read in information from the configuration file (115) and use that information to choose which audio files and/or audio samples should be used and how they should be used in generating the audio file by the device (205). Each rule may be written in computer-readable program code.

The rules may also be used to define what time in the event-driven audio file any audio files and/or audio samples are to be placed. In one example a rule may choose a plurality of audio samples at random from a number of audio samples and places them in the specified locations within the audio file being created. The rule may comprise a computationally based randomization process that will choose the plurality of audio samples randomly such as the Yarrow algorithm and the Fortuna with each of these assigning a number to the possible audio samples and choosing randomly from those numbered possibilities.

In another example, a rule may implement an API query that retrieves data from a data provider external to the device (205) and parses the data before using the data to select audio samples that reflect, for example, weather conditions in a geographical area, traffic conditions on streets a user would travel on that day, a current time and date. This rule may direct that these audio samples be placed in locations within the audio file being created. An example of such a rule defined as a script may be in the CD-ROM disk, with a folder entitled "Creating an event-driven audio file" and a file name of "weather.txt" (herein referred to as "weather"). This weather.txt file may be executed as a .py file and may be written in Python® v.3 code. This computer-readable program code defined therein is incorporated by reference herein. Python computer code is an executable program code developed by the Python Software Foundation. In one example, the rules may be written in a .java, .rb, or .rbw file format. In the present specification an in the appended claims, the term "script" is meant to be understood as computer-readable program code that interprets (rather than compiles) and automates the execution of tasks. In this example, the scripts may give a user of the device (105) flexibility in how the event-driven audio file is created without having the user knowing how to write code.

In one example, a rule may cause the selection, at random, of a number of audio files and/or audio samples and direct those audio files and/or audio samples to be placed in specific places within the event-driven audio file. In this example, a user may provide any number of audio files and/or audio samples and the rule may cause the audio engine (120) to randomly choose which audio files and/or audio samples to use. An example of such a rule defined as computer readable program code may be in the CD-ROM disk, with a folder entitled "Creating an event-driven audio file" and a file name of "improv.txt" (herein referred to as "improv"). This improv.txt file may be executed as a .py file and may be written in Python® v.3 code. This computer-readable program code defined therein is incorporated by reference herein. Python computer code is an executable program code developed by the Python Software Foundation. In one example, the rules may be in a .java, .rb, or .rbw file format.

The configuration file generator module (215) may also receive data associated with a queue or sequence of rules. Each rule created via input from a user may also be sequentially executed by the device (205) as dictated by the user. In this example, a user may indicate which rules will be executed first and the configuration file (115) may be created such that the computer readable code embodying those rules defined therein will be read by an audio engine in that specific sequence.

The configuration file generator module (215) may also receive data indicating a key or tonic chord the event-driven audio file is to be in, the tempo of the event-driven audio file, the beats per measure of the event-driven audio file, among other composition related settings. These settings may be incorporated into the configuration file (115) to further instruct an audio engine how to compose the event-driven audio file.

With the above data, the configuration file generator module (215) may generate a configuration file. During operation of the device (205), the configuration file (115) may be received by an audio engine (120). The configuration file (115) may comprise any type of computer readable program code that may be read by the audio engine (120) and that causes the audio engine (120) to create an event-driven audio file.

Reference is again drawn to the default computer readable program code prior to user input found in the CD-ROM disk being incorporated herein. The default code described may be augmented via user input to the configuration file generator (215) to change the values of any individual setting. For example, the "BASE" setting under "clips" may be changed from "false" to a specific link, URL, or file path where a base track may be found and accessed. This change is completed when a user, via a prompt from a graphical user interface associated with the device (205), indicates where the audio engine (120) is to access the base track. In another, example, the "subdirectories" setting may further be augmented to include additional audio files and/or audio samples to which the audio engine (120) may have access to during the creation of the event-driven audio file.

As seen above, the default computer readable code comprises a "feeds" setting. The "feeds" setting may indicate to the audio engine (120) where to look to for any device-external data feeds as described above. In one example, the device (205) may prompt a user to indicate what device-external data feeds are to be used during the creation of the event-driven audio file. In one example, a user may indicate that a device-external data feed such as a website predicting the weather or describing current weather is to be used as the data feed and is therefore indicated in the computer program code of the configuration file. In one example, the indication of a device-external data feed may cause the audio engine (120) to retrieve data from the device-external data feed and incorporate that data into the event-driven audio file generated by the audio engine (120). In this example, human readable text found on the device-external data feed may be converted to sound using a text-to-speech computer program. In one example, the data retrieved from the device-external data feed may be analyzed and any prepared audio samples may be incorporated into the event-driven audio file by the audio engine (120) based upon that analysis thereby contributing to the decision criteria in the selection and arrangement of the audio files and/or audio samples described herein.

With the input from the user, the configuration file may be sent to the audio engine (120) for execution. An example of the computer program code defining the configuration file (115) is found in the CD-ROM disk, with a folder entitled "Creating an event-driven audio file" and a file name of "Example 1 event-driven audio computer readable code." (herein referred to as "Example 1"). The computer-readable program code defined therein is incorporated by reference herein.

Another example of the computer program code defining the configuration file (115) is found in the CD-ROM disk, with a folder entitled "Creating an event-driven audio file" and a file name of "Example 2 event-driven audio computer readable code" a (herein referred to as "Example 2" and "Example 3" respectively). The computer-readable program code defined therein is incorporated by reference herein.

With this computer readable code (example 1, example 2) defined in the configuration file (115), the configuration file (115) may be sent to the audio engine (120) for processing. The audio engine (120) may use the configuration file (115) generated along with a number of links or file paths to external-data feeds to create an event-driven audio file. As described above, the number of device-external data feeds may comprise information regarding current weather, current traffic reports, current news articles, and the date and time. This information may be used in the selection and arrangement of any aspects of the event-driven audio file using, for example, the current events described in the data feeds.

The audio engine (120) may import the configuration file (115) and parse its contents into a machine-readable format. For each rule in each queue, the audio engine (120) may sequentially import the computer-readable program code or instructions associated with the individual rules. The audio engine (120) may then access any specified device-external data feeds and retrieve the data associated therewith. Any computer-readable computer code comprising instructions to the audio engine (120) to be executed may be executed. For example, the computer-readable program code defining the locations in time within the base track of where different audio files and/or audio samples will be placed will be read and executed by the audio engine (120) as described above.

The audio engine (120) may also pass any data associated with any audio samples, base tracks, and/or audio tracks to an arranger associated with the audio engine (120). The arranger may iterate through the data including the list of key/value pairs assigning names to the references links or URLs. The arranger may then load any audio files and/or audio samples accessed at each link, create a silent track for each queue or sequence of rules and place each audio file or audio sample into the temporal location on the silent track where so indicated by the computer readable program code. The silent track is an audio track comprising no audio data. As each audio file or audio sample received is placed in their locations within the silent track, the arranger may overwrite any prior audio data from the same queue that was placed in the same locations within the silent track.

After the audio files and audio samples have been arranged on the silent track according to the computer readable program code of the configuration file, the audio engine (120) may adjust the audio or each individual audio sample or file based on any mix settings as specified in the computer readable program code defined in the configuration file. Where the mix settings of each individual audio sample or file is adjusted, each of the audio samples or files, including any base track, may be combined into a single unified event-driven audio file. While combining the audio samples or files, the audio engine (120) may adjust, in tandem, the gain of each audio sample or file according to the computer readable program code of the configuration file. The audio engine (120) may then, apply any master settings to the event-driven audio file, name the file, and attach a time stamp to the file before converting the file into an appropriate code, saving the file to disk, and returning a link to the event-driven audio file. In one example, the event-driven audio file may be saved to a memory device associated with the device (205). In another example, the audio engine (120) may save the event-driven audio file to a memory device external to the device (205) and accessed by the device (205) over a network.

Figure 3:
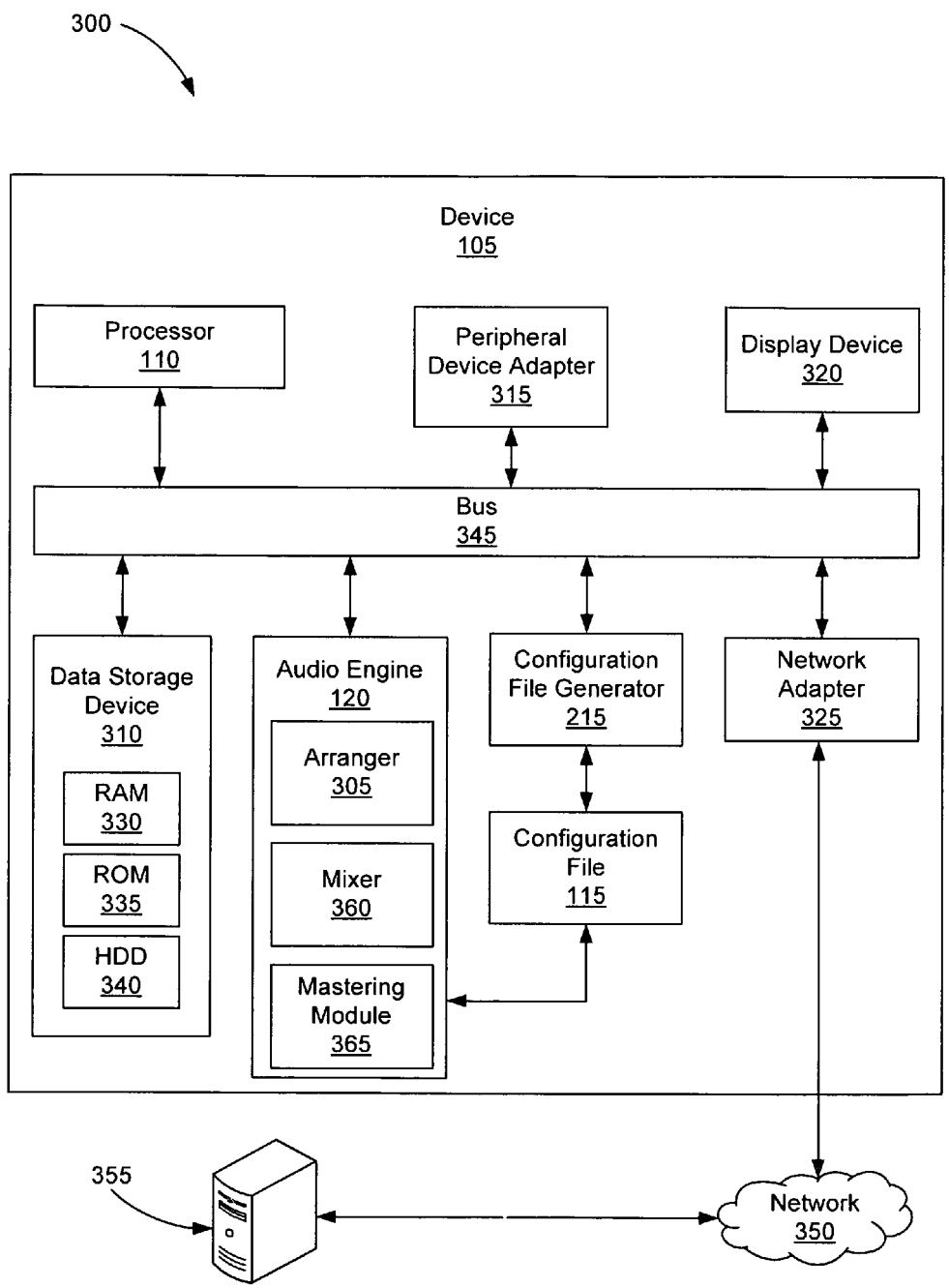
FIG. 3 is a block diagram of a device for creating event-driven audio according to an example of the principles described herein.

FIG. 3 is a block diagram of a device (205) for creating event-driven audio according to an example of the principles described herein. In addition to the processor (110), the configuration file generator (215), audio engine (120), the device (205) may further comprise an arranger module (305), a mixer module (360), a mastering module, (365), a number of data storage devices (310), a number of peripheral device adapters (315), a display device (320), and a number of network adapters (325). Each of these may be communicatively coupled via a bus (345).

As described above, the arranger module (305) may be instructed by the audio engine (120) to begin with a silent track and arrange any number of audio files, audio samples, and/or base tracks by incorporating those audio files, audio samples, and/or base tracks into the silent track. The data associated with the audio files, audio samples, and/or base tracks such as the URLs are also referenced, accessed, and used by the arranger module (305). The arranger module (305) may iterate through the data retrieved by the audio engine (120) including the list of key/value pairs assigning names to the references links or URLs. The arranger may load any audio files and/or audio samples accessed at each link, create a silent track for each queue or sequence of rules, and place each audio file or audio sample into the temporal location on the silent track where so indicated by the computer readable program code of the configuration file. The arranger module (305) also receives the data associated with the length of the track from the audio engine (120) and adjusts the length of the track as indicated.

The mixer module (360) may be instructed by the audio engine (120) to receive the silent tracks, audio files, audio samples, and/or base tracks as arranged by the arranger (305) and combine the audio files, audio samples, and/or base tracks together while touting, changing the level, timbre and/or dynamics of the audio signals of the audio files, audio samples, and/or base tracks. Each of these changes are made according to the configuration file received by the audio engine (120) and created by the user.

The mastering module (365) may finalize the silent track, audio files, audio samples, and/or base tracks received from the mixer module (360) such that a final version of the event-driven audio file is created. Finalization of the event-driven audio track is completed according to the computer-readable program code defined in the configuration file received by the audio engine (120). The mastering module (365) may output, to a user via the display device (320) or speakers associated with the device (105) the finalized event-driven audio file.

The data storage devices (310) may store data such as executable program code that is executed by the processor (110) or other processing device. In one example, the data storage device (310) may specifically store computer code representing a number of applications that the processor (110) executes to implement at least the functionality described herein.

The data storage device (310) may include various types of memory modules, including volatile and nonvolatile memory. For example, the data storage device (310) of the present example includes Random Access Memory (RAM) (330), Read Only Memory (ROM) (335), and Hard Disk Drive (HDD) memory (340). Many other types of memory may also be utilized, and the present specification contemplates the use of many varying type(s) of memory in the data storage device (310) as may suit a particular application of the principles described herein. In certain examples, different types of memory in the data storage device (310) may be used for different data storage needs. For example, in certain examples the processor (110) may boot from Read Only Memory (ROM) (335), maintain nonvolatile storage in the Hard Disk Drive (HDD) memory (340), and execute program code stored in Random Access Memory (RAM) (330).

Generally, the data storage device (310) may include a computer readable medium, a computer readable storage medium, or a non-transitory computer readable medium, among others. For example, the data storage device (310) may be, but not limited to, a system, apparatus, or device implementing electronic, magnetic, optical, electromagnetic, infrared, or semiconductor, devices therein or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that may contain, or store computer usable program code for use by or in connection with an instruction execution system, apparatus, or device. In another example, a computer readable storage medium may be any non-transitory medium that may contain, or store a program for use by or in connection with an instruction execution system, apparatus, or device.

The hardware adapters (315, 325) in the device (100) enable the processor (110) to interface with various other hardware elements, external and internal to the device (100). For example, the peripheral device adapters (315) may provide an interface to input/output devices, such as, for example, a display device (320), a mouse, or a keyboard. The peripheral device adapters (315) may also provide access to other external devices such as an external storage device, a number of network devices such as, for example, servers, switches, and routers, client devices, other types of computing devices, and combinations thereof.

The display device (320) may be provided to allow a user of the device (100) to interact with and implement the functionality of the device (100). The peripheral device adapters (315) may also create an interface between the processor (110) and the display device (320), a printer, or other media output devices. The network adapter (325) may provide an interface to other computing devices or data feeds (355) within, for example, a network (350), thereby enabling the transmission of data between the device (100) and other devices located within the network.

The device (100) may, when executing computer readable program code with the processor (110), display the number of graphical user interfaces (GUIs) on the display device (320) associated with the executable program code representing the number of applications stored on the data storage device (310). The GUIs may include aspects of the executable code including data fields used to place input data into in order to create a configuration file (115) as described above. The GUIs may display, for example, a number of question fields into which a user may enter appropriate data to create a configuration file. The GUIs may also display a number of event-driven audio file locations for the user to access. Additionally, via making a number of interactive gestures on the GUIs of the display device (320), a user may complete these tasks. Examples of display devices (320) include a computer screen, a laptop screen, a mobile device screen, a personal digital assistant (PDA) screen, and a tablet screen, among other display devices (106).

Figure 4:
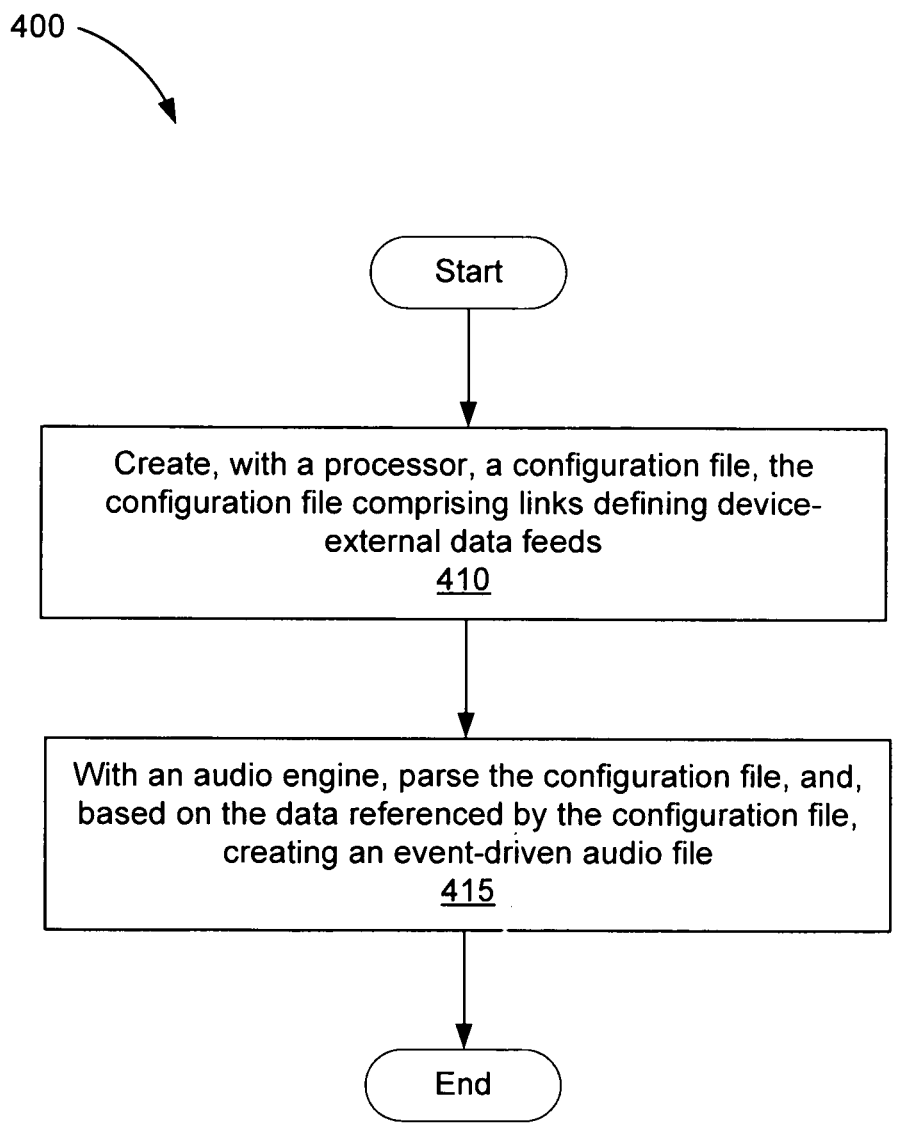
FIG. 4 is a flowchart showing a method of generating event-driven audio according to one example of the principles described herein.

FIG. 4 is a flowchart showing a method (400) of generating event-driven audio according to one example of the principles described herein. The method (400) may include creating (405), with a processor, a configuration file, the configuration file (115) comprising data defining device-external data feeds. As described above, the device-external data feeds is any data source located external to the device (100). These may include a number of websites defined by URLs, APIs, and other databases or data volumes as described herein. The source identifications of these device-external data feeds are incorporated into the configuration file (115) for latter processing and access by the audio engine (120) as described above.

The method (400) may continue by parsing (410), with the audio engine, the configuration file, and, based on the data defined in the configuration file, creating an event-driven audio file. In one example, the configuration file may comprise links to the data feeds as well as references to audio data and scripts containing decision criteria for the automatic arrangement of the audio data based on the data feeds. As described above, the audio engine (120) may cooperate with an arranger (305) to create the event-driven audio file. This cooperation includes, for example, arranging any audio files and/or audio samples discovered and accessed by the audio engine (120) onto a silent track. The arranger (305) may also overwrite any prior audio data from the same queue that was placed in the same locations within the silent track so that no two audio files and/or audio samples are played over each other. In other examples, the arranger may receive instructions to specifically allow two audio files and/or audio samples to play concurrently. In this example, the user may have indicated that the two audio files and/or audio samples were to be or could be played simultaneously.

After the event-driven audio file has been created, the event-driven audio file may be saved in any location including the data storage device (310) of the device (100). For example, where the event-driven audio file is to be immediately played on, for example, speakers associated with the device (100), the event-driven audio file may be saved in RAM (330). Other examples may exist where different types of data storage devices (310) are used to maintain a copy of the event-driven audio file for immediate or later use.

During operation, a user may create an event-driven audio file automatically by simply imputing to the device (100) an indication to begin the process as described above. In some examples, the automation of the creation of an event-driven audio file may be accomplished by receiving, from a user, initial data describing how a number of event-driven audio file are to be created. Because the data feeds external to the device (100) may be changed periodically (weather, traffic, news, etc.) all of the number of event-driven audio files created may differ based upon those changes to the device-external data feeds. Additionally, the configuration file (115) may comprise, and the user may so indicate, that different audio files and/or audio samples are to be selected at random having random lengths and placed in random locations. This may further automate the creation of a new event-driven audio file every time, for example, a button is pushed. In one example, the user may input a schedule as to when a new event-driven audio file is to be created such that the device (100) creates a new event-driven audio file according to that schedule. In yet another example, the user may indicate to the device (100) that a newly created event-driven audio file scheduled to be created at a certain time will be created and played on, for example, a set of speakers associated with the device (100).

In another example, a number of calendaring programs may serve as one of the number of device-external data feeds. The device (100) may, via a graphical user interface presented on the display device (320), present a request from the user to identify a device-external calendaring system database to which the audio engine (120) may be directed to in order to retrieve data from that calendaring system. The reference link or URL to the calendaring system database may be entered into the graphical user interface by the user. Upon execution of the configuration file, the audio engine (120) may retrieve any data associated with, for example, the user that may be converted into an audio file using text-to-speech software. These audio files and/or audio samples may be used in the creation of the event-driven audio file to inform the user of his or her upcoming schedule. These audio files and/or audio samples may be combined with any number of other audio files and/or audio samples to create the event-driven audio file described herein.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (110) of the device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe the creation of an event-driven audio file, the device and method to do so. The method and device for creating an event-driven audio file may allow a user to write a simple configuration file (115) that may provide instructions to create a new audio track each instance when a user triggers the process. The user interfaces provided to the user may quickly allow a user to select a mixture of audio files and/or audio samples to be used in creation of an event-driven audio file as well as a base track and device-external data feeds to personalize further the track being created. The user may also set a number of rules and scripts that may be used by the audio engine (120) to create the event-driven audio file. Some rules may include randomization of all aspects of the use of the audio files and audio samples. Still further, the device and method may allow a user to reference a schedule or calendar of events so that these data feeds may also be used to both create the event-driven audio file as well as trigger the creation of the event-driven audio file.

The preceding description has been presented to illustrate and describe examples of the principles described. This description is not intended to be exhaustive or to limit these principles to any precise form disclosed. Many modifications and variations are possible in light of the above teaching.

What is claimed is:

1. A device for creating an event-driven audio file, comprising:
   a processor;
   an audio engine to, when executed by the processor, receive a configuration file designating a number of device-external data feeds and create an event-driven audio file based on the configuration file;
   wherein the configuration file designates a list of links to audio samples and scripts containing rules for accessing the device-external data feeds;
   wherein the configuration file comprises audio length data indicating the length of the event-driven audio file to be created by the audio engine; and
   wherein the audio engine parses the configuration file and creates a silent track based on the audio length data defined in the configuration file and adds to the silent track the number of audio samples.

2. The device of claim 1, wherein the device-external data feeds comprise weather websites, linked databases, market websites, time databases, traffic websites, audio samples, scripts comprising rules, or a combination thereof.

3. The device of claim 1, wherein the rules comprise audio placement rules that indicate where within the event-driven audio file a number of audio samples are to be placed; the audio placement rules being added to the configuration file.

4. The device of claim 1, wherein the configuration file comprises a number of automatic programming interface queries that instruct the audio engine to: access the data from device-external data feeds according to a specified rule, and parse the data accessed to select a number of audio samples based on decision criteria specified in the specified rule.

5. The device of claim 1, where the configuration file comprises mix data indicating mix settings to be applied to at least a portion of the event-driven audio file.

6. A method of creating event-driven audio, comprising:
    creating, with a processor, a configuration file, the configuration file comprising links defining device-external data feeds;
    with an audio engine, parsing the configuration file, and, based on the data referenced in the configuration file, creating an event-driven audio file; and
    with the processor:
        receiving audio length data indicating the length of the event-driven audio file to be created by the audio engine;
        receiving audio placement rules that indicate where within the event-driven audio file a number of audio samples are to be placed;
        receiving a number of automatic programming interface (API) queries that instruct the audio engine to access data from the device-external data feeds according to a number of API rules specified by the configuration file and parse the accessed to select the number of audio samples based on decision criteria in the specified rule;
        receiving mix data indicating mix settings to be applied to at least a portion of the event-driven audio file;
        receiving data defining a base audio track;
        or a combination thereof.

7. The method of claim 6, wherein the configuration file is generated using a configuration file generator and wherein the configuration file generator further receives, from a user, data indicating a list of links to audio samples and scripts containing rules for accessing the device-external data feeds.

8. The method of claim 6, wherein the links defining device-external data feeds comprise weather websites, linked databases, market websites, time databases, traffic websites or a combination thereof.

9. The method of claim 6, further comprising passing the audio length data, audio placement rules, number of automatic programming interface queries, mix data, and basic audio track data to an arranger module to iterate through the data, load any audio samples and create a silent track to place the audio samples into the silent track.

10. The method of claim 6, further comprising creating an updated configuration file based on changes to the data associated with the device-external data feeds.

11. The method of claim 10, wherein the updated configuration file is created by copying the configuration file and updating data received from the external data feeds.

12. A non-transitory computer-readable storage medium comprising instructions which, when executed by a processor of a device for generating an event-driven audio file, causes the processor to:
    create a configuration file comprising links defining device-external data feeds;
    with an audio engine, parse the configuration file and create an event-driven audio file;
    receive data from the device-external data feeds and links to a number of audio samples and parse the data from the device-external data feeds; and
    create a silent track based on audio length data defined in the configuration file and add the number of audio samples to the silent track.

13. The non-transitory computer-readable storage medium of claim 12, wherein the device-external data feeds comprise weather websites, linked databases, market websites, time databases, traffic websites or a combination thereof.

14. The non-transitory computer-readable storage medium of claim 12, further comprising instructions to receive a number of automatic programming interface queries that instruct the audio engine to access data from the device-external data feeds according to a number of API rules specified by the configuration file and parse the accessed to select the number of audio samples based on decision criteria specified in the specified rule.

* * * * *